United States Patent
Clark et al.

(12)

(10) Patent No.: US 6,669,260 B2
(45) Date of Patent: Dec. 30, 2003

(54) MODULAR SYSTEM FOR A VEHICLE

(75) Inventors: Kenneth M. Clark, Holland, MI (US); Curt R. Johnson, Holland, MI (US); J. Peter Cansfield, Holland, MI (US); David B. Fry, Holland, MI (US); Kermit M. Anderson, Holland, MI (US); Bradley A. Beers, Door, MI (US); Darin R. Billot, Holland, MI (US); L. Robert Hamelink, Holland, MI (US); Dale A. Gort, Holland, MI (US); Eric D. Rennie, Spring Lake, MI (US); Charles E. Beasley, Zeeland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/846,811

(22) Filed: May 1, 2001

(65) Prior Publication Data

US 2002/0163219 A1 Nov. 7, 2002

(51) Int. Cl.$^7$ .................................................. B60N 3/00
(52) U.S. Cl. ...................................... 296/37.8; 224/311
(58) Field of Search ............................. 296/37.8, 37.12, 296/37.13, 37.14, 37.16, 37.7; 224/311, 281

(56) References Cited

U.S. PATENT DOCUMENTS

| | | |
|---|---|---|
| 1,674,340 A | 6/1928 | Nock |
| 2,120,619 A | 6/1938 | Matthiesen |
| 2,929,539 A | 3/1960 | Safreno |
| 3,451,035 A | 6/1969 | Baldwin |
| 3,474,381 A | 10/1969 | Baldwin |

(List continued on next page.)

FOREIGN PATENT DOCUMENTS

| | | | |
|---|---|---|---|
| DE | 23 59 718 A1 | 11/1973 | |
| DE | 31 51 098 A1 | 12/1981 | |
| DE | 690 03 767 T2 | 7/1990 | |
| DE | 41 16 758 C2 | 5/1991 | |
| DE | 44 38 623 A1 | 10/1994 | |
| DE | 198 22 638 A1 | 12/1999 | ........... B60R/11/00 |
| DE | 199 09 732 A1 | 9/2000 | |
| DE | 201 03 563 U1 | 2/2001 | |
| DE | 298 08 950 U1 | 8/2001 | |
| EP | 0 178 196 A1 | 4/1986 | |
| EP | 0 342 345 B1 | 1/1994 | |

(List continued on next page.)

OTHER PUBLICATIONS

Form PCT/ISA/210, Patent Cooperation Treaty (PCT) International Search Report, Sep. 09, 2002 (5 pp.).
Prince Corporation, "Reposition Features", O•ZONE Project, bearing an indication of "May 01, 1996–Nov. 01, 1996", (7 pages).
"Power Spine ®", O•ZONE, bearing and indication of "©1996 Prince Corporation, 7–23–96" (2 pages).
"Innovation in the most pleasing form!", *Automotive & Transportation Interiors*, a Publication of Shore–Varrone, Inc., Nov. 1998 (1 page).
Johnson Controls Design, Concept Sketch, 1994 (1 page).

*Primary Examiner*—Joseph D. Pape
(74) *Attorney, Agent, or Firm*—Foley & Lardner (57) ABSTRACT

A modular system for a vehicle is provided which includes one or more elongated members adapted to be coupled to an interior portion of a vehicle, where one or more removable articles are configured for attachment to one or more of the members and a utility system provides utilities to the articles. One or more holders are positioned to align with the members and are coupled to the articles for attaching the articles to one or more of the members.

67 Claims, 10 Drawing Sheets

U.S. PATENT DOCUMENTS

| | | |
|---|---|---|
| 3,984,161 A | 10/1976 | Johnson |
| 4,173,382 A | 11/1979 | Booty |
| 4,182,532 A | 1/1980 | Walker, Sr. |
| 4,441,641 A | 4/1984 | Thompson |
| 4,469,365 A | 9/1984 | Marcus et al. |
| 4,738,481 A | 4/1988 | Watjer et al. |
| 4,867,498 A | 9/1989 | Delphia et al. |
| 4,887,196 A | 12/1989 | Brown et al. |
| 4,974,129 A | 11/1990 | Grieb et al. |
| 5,040,990 A | 8/1991 | Suman et al. |
| 5,077,643 A | 12/1991 | Leach |
| 5,085,481 A | 2/1992 | Fluharty et al. |
| 5,113,318 A | 5/1992 | Conley |
| 5,128,847 A | 7/1992 | Lin et al. |
| 5,154,617 A | 10/1992 | Suman et al. |
| 5,180,089 A | 1/1993 | Suman et al. ......... 224/42.45 R |
| 5,285,941 A | 2/1994 | Herrera |
| 5,303,970 A | 4/1994 | Young et al. |
| 5,599,086 A | 2/1997 | Dutta |
| 5,823,599 A | 10/1998 | Gray |
| 5,893,603 A | 4/1999 | Viertel et al. ................ 296/214 |
| 5,927,784 A | 7/1999 | Vitito |
| 5,954,252 A | 9/1999 | Gebreselassie et al. |
| 6,019,411 A | 2/2000 | Carter et al. |
| 6,062,623 A | 5/2000 | Lemmen |
| 6,086,129 A | 7/2000 | Gray |
| 6,092,704 A | 7/2000 | Baumeister |
| 6,116,674 A | 9/2000 | Allison et al. |
| 6,135,529 A | 10/2000 | De Angelis et al. |
| 6,158,639 A | 12/2000 | De Silva et al. |
| 6,158,795 A | 12/2000 | Gray et al. |
| 6,176,536 B1 | 1/2001 | Miller et al. |
| 6,203,088 B1 | 3/2001 | Fernandez et al. |
| 6,234,570 B1 | 5/2001 | Quinno et al. |
| 6,264,261 B1 | 7/2001 | Krafcik |
| 6,267,428 B1 | 7/2001 | Baldas et al. ............... 296/37.7 |
| 6,293,616 B1 | 9/2001 | Williams et al. .......... 296/203.1 |
| 6,321,960 B1 | 11/2001 | Ellis et al. ................... 224/274 |
| 6,338,517 B1 | 1/2002 | Canni et al. ............... 296/37.8 |
| 2001/0002253 A1 | 9/2001 | Pala et al. .................... 340/901 |

FOREIGN PATENT DOCUMENTS

| | | |
|---|---|---|
| EP | 0 795 437 A2 | 9/1997 |
| EP | 1 092 590 A1 | 4/2001 |
| GB | G 86 18 079 | 7/1986 |
| JP | 57-167838 | 10/1982 |
| JP | 61-150237 | 9/1986 |
| JP | 9-58359 | 3/1997 |
| JP | 9-58360 | 3/1997 |
| JP | 9-58361 | 3/1997 |
| JP | 11-129827 | 5/1999 |
| JP | 2001-055091 | 2/2001 |
| WO | WO 99/48724 | 9/1999 |

MODULAR SYSTEM FOR A VEHICLE

FIELD OF THE INVENTION

The present invention relates to a modular system for a vehicle.

BACKGROUND OF THE INVENTION

Modular storage compartments in the forward portion of vehicles are generally known and include consoles and structures for mounting items such as lamps, small storage compartments and electronic instrumentation such as compasses, temperature displays and clocks. Such modular systems typically have mounting configurations that permanently attach such articles to a structural portion of the vehicle, whereby installation of article options are typically conducted in a factory setting during vehicle construction and often requires user-selection of the desired articles prior to vehicle assembly, or user acceptance of preinstalled option packages.

Accordingly, it would be advantageous to provide a modular system for interchangably mounting a wide array of selectively removable, user-oriented articles that are adapted for use within, or in conjunction with, a vehicle. It would also be advantageous to provide such a modular system along substantially the entire length of the interior overhead portion of a vehicle as well as the interior sides of a vehicle, or within the interior cargo space of a vehicle. It would also be advantageous to provide a modular system that provides concealed distribution of utilities from vehicle utility supply sources to the interchangably selected articles. It would be further advantageous to provide a modular system whereby certain classes of articles are capable of installation only in predetermined portions of a vehicle area to minimize potential distractions to a vehicle operator.

SUMMARY OF THE INVENTION

A modular system for a vehicle, including one or more elongated members adapted to be coupled to a portion of a vehicle interior, one or more articles configured to removably attach to one or more of the members, and a utility system for providing utilities to the articles.

A system for attaching articles to a portion of the interior of a vehicle, including one or more members coupled to the vehicle interior portion, one or more articles adapted for mounting to the members along the vehicle interior portion, and one or more holders coupled to the article and adapted to interface with the members, the holders positioned on the article to align with the members.

DETAILED DESCRIPTION OF THE PREFERRED EMBODIMENTS

Figure 1:
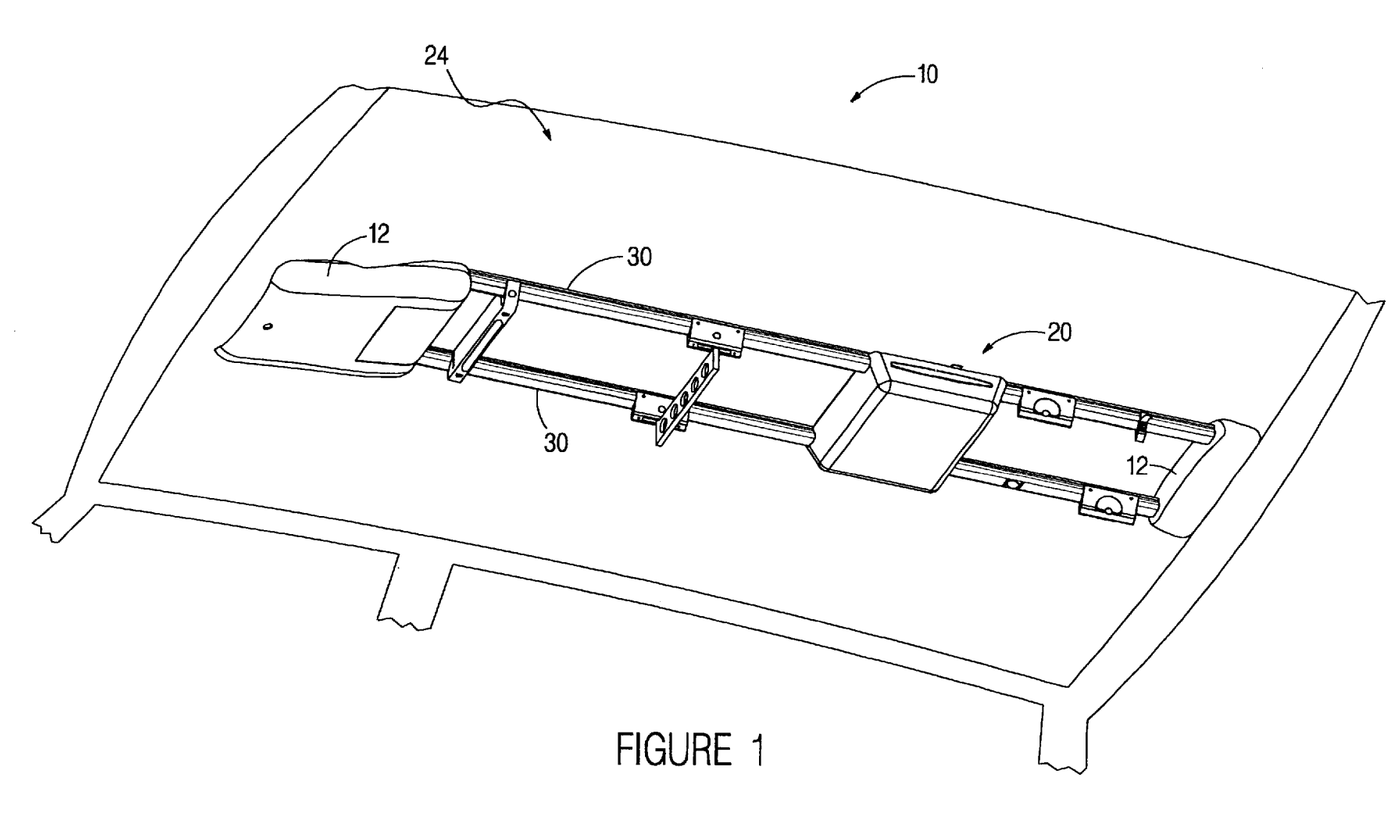
FIG. 1 is an upward-looking perspective view of a modular system mounted on a vehicle interior according to a preferred embodiment.
Figures 2A, 2B:
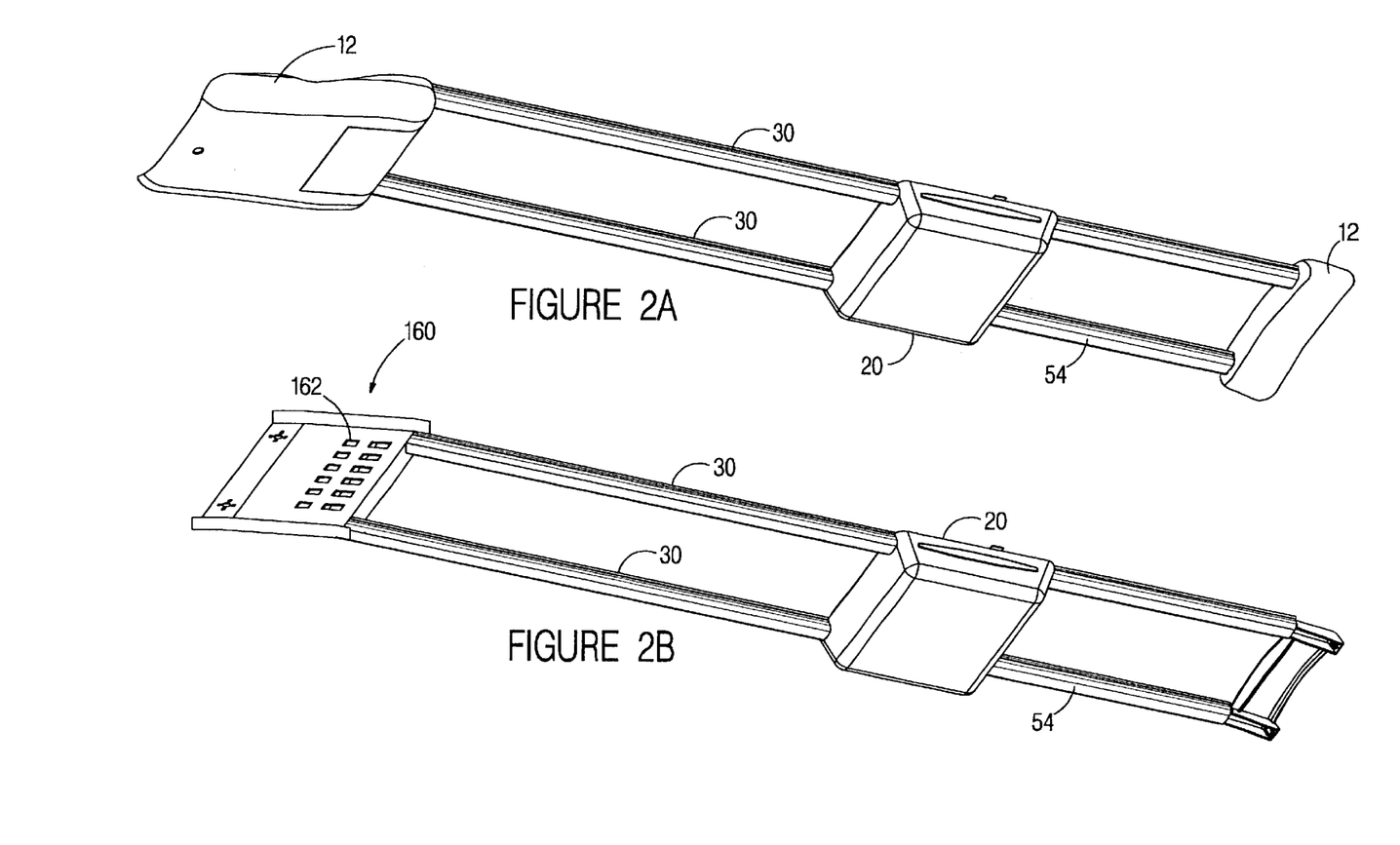
FIG. 2A is an upward looking perspective view of a modular system with end cover trim pieces according to a preferred embodiment.
FIG. 2B is an upward looking perspective view of a modular system with end cover trim pieces removed according to a preferred embodiment.
Figure 15:
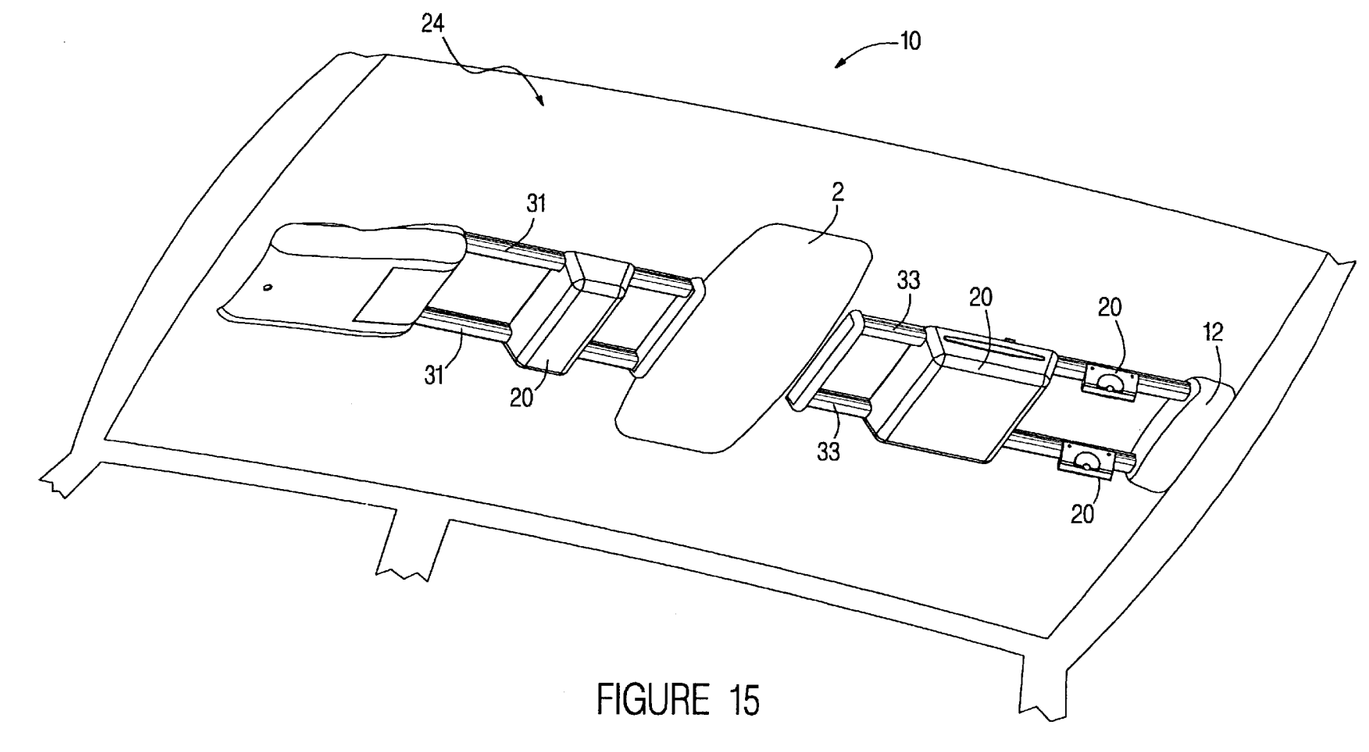
FIG. 15 is an upward looking perspective view of a modular system mounted on a vehicle interior according to an alternative embodiment.
Figure 16:
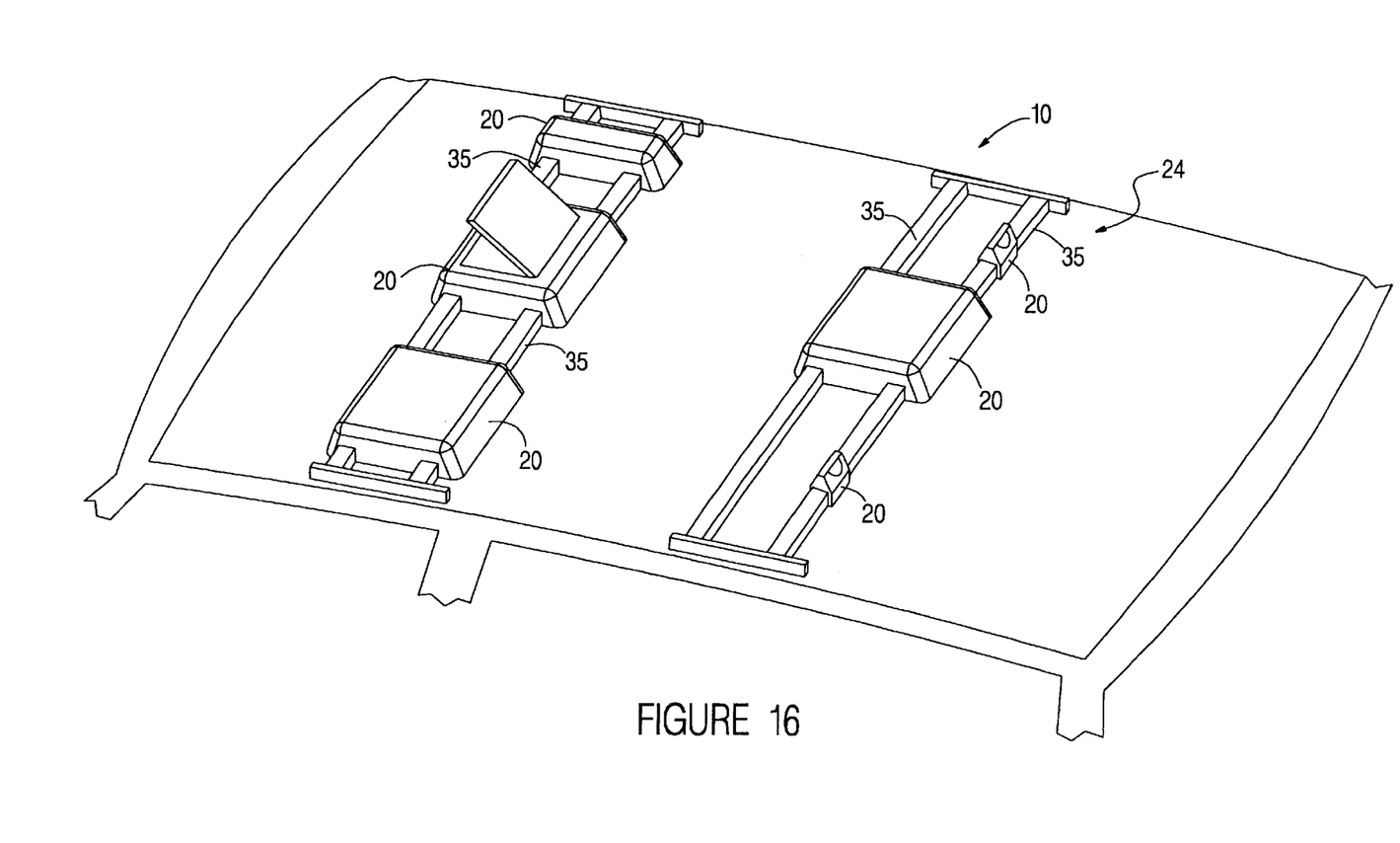
FIG. 16 is an upward looking perspective view of a modular system mounted on a vehicle interior according to another alternative embodiment.
Figure 17:
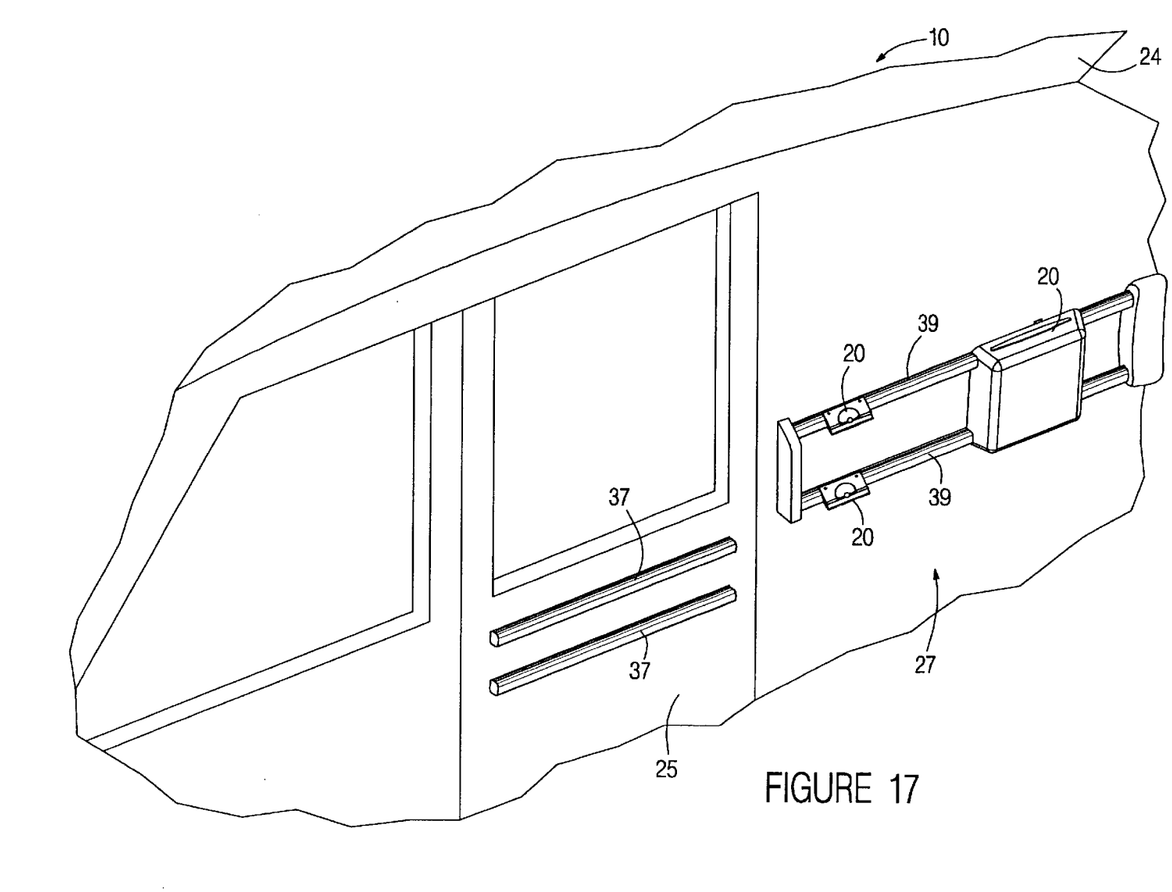
FIG. 17 is a perspective view of a modular system mounted on a vehicle interior according to another preferred embodiment.

Referring to FIGS. 1 and 2, a modular system 10 for mounting one or more articles 20 is shown schematically (exemplary articles will be further described herein) along an interior panel 24 (e.g. door or side panel, cover, headliner, etc.) of a vehicle according to a preferred embodiment. System 10 may also be adapted for mounting articles 20 on members 37 along the sides of the vehicle such as door or side panels 25 (as shown schematically in FIG. 17), or on members 39 within the interior space of the vehicle such as cargo areas 27 (as shown schematically in FIG. 17), in a manner similar to the method described herein. System 10 includes two generally parallel mounting members 30 such as rails, tracks, channels, holders, bars, rods, poles, etc. that are oriented in any desired configuration within a vehicle along interior panel 24. Members 30 have a lateral spacing that is generally fixed for a particular vehicle style, but the spacing may vary between different vehicle styles and models and may have any lateral spacing suitable for mounting articles 20. One or more positioners 31 shown schematically in FIG. 3 may be used to secure the lateral spacing of members 30 for receiving articles 20. For overhead applications, members 30 may be oriented longitudinally centered laterally within the vehicle, but may be located at any lateral position on the interior panel 24 to accommodate mounting of articles 20. In an alternative embodiment, the mounting members may be separated into a forward segment 31 and/or a rearward segment 33 for adapting to roof windows 29 or other discontinuities in the roof structures (such as a sunroof as shown schematically in FIG. 15). The mounting members may also be oriented laterally along interior panel 24 (such as the laterally oriented members shown schematically as members 35 in FIG. 16) to increase the flexibility and utility of the system for interchangeably receiving the articles 20. In another alternative embodiment, a single member may be used in conjunction with articles that are adapted to selectively and interchangeably engage a single member. In a further alternative embodiment, members may be mounted to pillars (not shown) or other generally vertical support columns within the interior space of a vehicle to provide a system for attaching articles. Such pillars may be secured by articles mounted to the members for increased flexibility in attaching articles to the pillar-mounted members.

Figure 6:
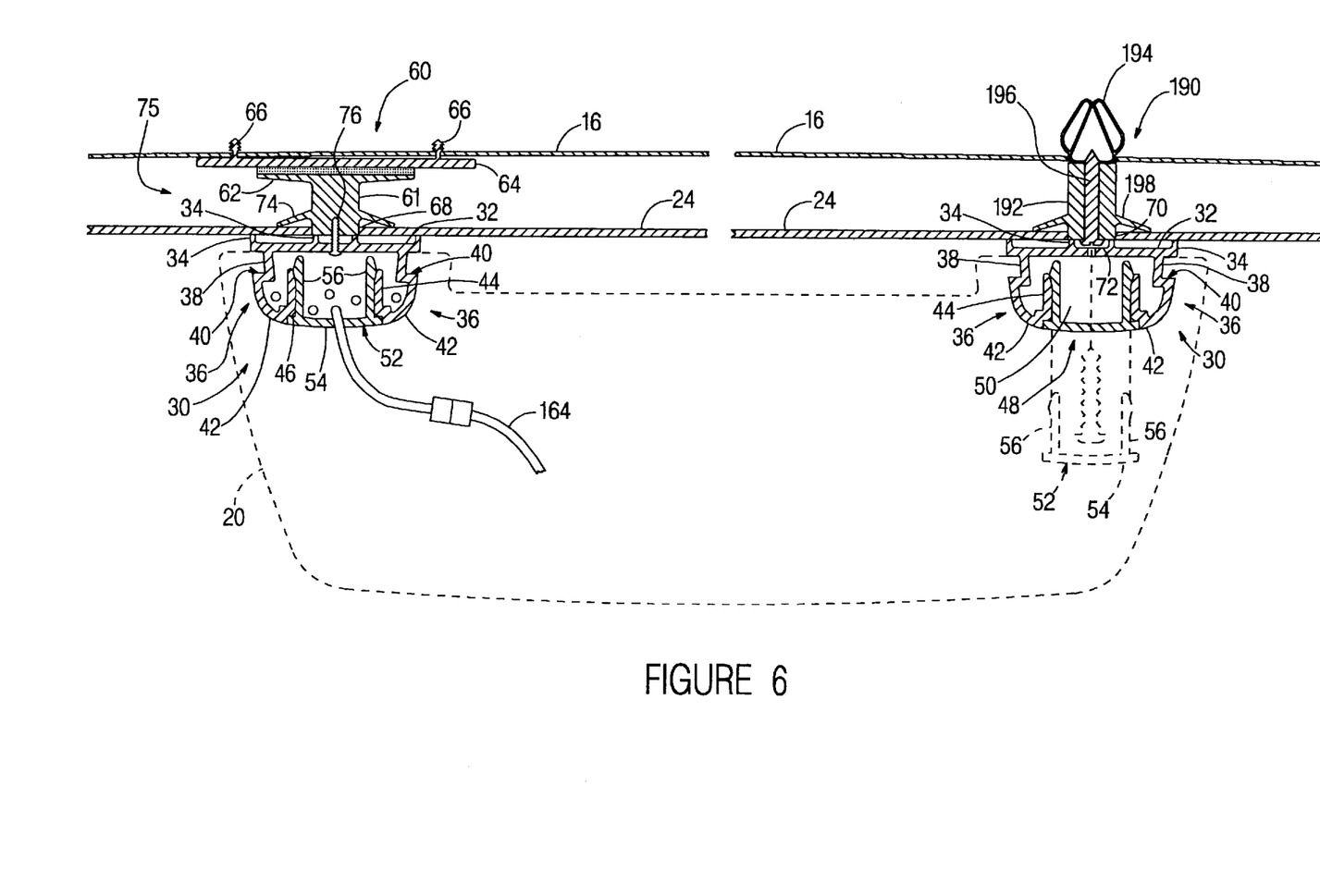
FIG. 6 is a cross sectional view of a modular system along line 6—6 of FIG. 3 according to a preferred embodiment.

Referring to FIG. 6, the structural shape of members 30 are shown according to a preferred embodiment. Members 30 have a generally hollow cross sectional shape as shown in FIG. 6, and include a generally flat base 32 (e.g. back, contact surface, etc.) on the top of member 30 with several longitudinal ribs 34 projecting therefrom. Ribs 34 are provided at the outside edges to grip the surface of interior panel 24 and a pair of ribs 34 are located centrally for alignment with connectors 160 or 60 when members 30 are secured to the roof structure. Members 30 further include integral sides 36 having a recess 38 (e.g. notch, inset, slot, groove, channel, etc.) forming an outwardly projecting supporting ledge 40 (e.g. corner, shoulder, edge, etc.). Recesses 38 and ledges 40 provide an external structure for receiving and supporting the articles 20 (shown schematically) having corresponding structure adapted to mate with ledges 40. In a particularly preferred embodiment, ledge 40 is horizontal (as shown) and ledge 40 and recess 38 are formed having an angle of 90 degrees or less for providing a structure for receiving articles 20. In an alternative embodiment, member 30 may have a circular cross sectional shape (not shown) or any other shape where the exterior surface is configured to provide longitudinal recesses and ledges similar to recesses 38 and ledges 40 for receiving and supporting the articles 20. In another alternative embodiment, member 30 may have a second recess and ledge (not shown) for providing an alternative article mounting interface and providing structure adaptable for mounting interlocks that may prohibit or allow installation of certain articles along particular locations of members 30.

Beneath ledges 40, sides 36 include inwardly curved lower sections 42 that terminate into a return bend 44 providing internal corners 46 to create a longitudinal opening 48. Opening 48 creates a passage 50 (e.g. channel, path, conduit, tunnel, etc.) within members 30 for routing utility carriers such as wires, cables, fiber optics, etc. as shown schematically in FIGS. 5 and 6. A removable cap 52 is provided generally along the entire length of member 30 having a cover 54 to cover opening 48 and retain utility carriers, and may have a flush fit with member 30, or may have projecting contours, ribs, or other decorative or useful structure (not shown). Cap 52 includes two inwardly projecting legs 56 that fit within opening 48 and are removably retained in place by an interference type, snap-fit engagement with return bends 44. Opening 48 may be entirely or partially concealed by inserting one or more caps 52 having segments of various lengths tailored to create an access pattern within members 30. The access pattern may be created or modified at any time for selectively providing access to opening 48 along the length of member 30. Member 30 and cap 52 are preferably made of acrylonitrile butiadene styrene (ABS) plastic in an extrusion process, and may be provided in a wide variety of colors designed to accent an interior trim color scheme. Alternatively, members 30 and cap 52 may be made of aluminum or any other suitable material, wherein members 30 or cap 52 may also serve as a conductor for transmitting low voltage electrical power from a vehicle supply source to articles 20 mounted on members 30. The outer surface of the aluminum members is preferably anodized which provides an insulating layer on the exterior of the member, which may be selectively removed to provide a custom-tailored electrical conductivity access pattern. Portions of members 30 and cap 52 that are not otherwise enclosed by articles 20 may also have a separate insulating cover (not shown) that snap fits into recesses 38 and ledges 40 to electrically isolate members 30 from consumer contact or inadvertent contact with an electrical ground. Members 30 and cap 52 may also be made of any other material suitable for forming an elongated support member and receiving mounting structure from articles 20 to be supported therefrom.

Figure 4:
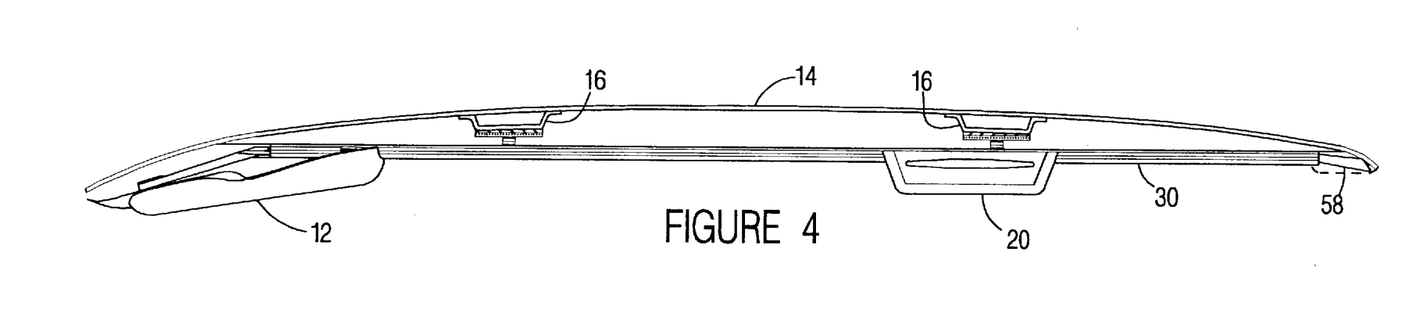
FIG. 4 is a side elevation of a modular system according to a preferred embodiment.

Referring to FIG. 4, members 30 are secured to the vehicle according to a preferred embodiment. The ends of members 30 are rigidly attached to the forward and rearward edges of the roof frame (e.g. beams, headers, bows, crosspieces, etc.—not shown) by welding, brazing or fastening with conventional fasteners (not shown). Members 30 may have ends attached directly to the frame, or members 30 may be attached to the roof frame via fixtures shown schematically as brackets 58. Brackets may also be provided to support the ends of member segments that abut a roof discontinuity such as a sunroof, etc. The forward and rearward end connections of members 30 are covered by suitable trim components shown schematically as a bezel or molding 12. Members 30 may have a side profile that is straight, or a side profile that is slightly curved or bowed (not shown) to correspond with the panel profile 14 (shown as a roof panel). In an alternative embodiment, members 30 may be secured to door panel structures (not shown) or to pillars or other support columns (not shown) within the interior of the vehicle. Such support columns may be permanently fixed to the interior vehicle structure or may be removably or retractably attached to vehicle structure such as the floor, roof or sides of the vehicle to create a modular system for attaching articles within any interior location of a vehicle.

Referring further to FIGS. 4 and 6, a structural support system for the interior span of members 30 is shown according to a preferred embodiment. The interior span of members 30 are coupled to the roof structure of the vehicle using connectors 190 (e.g. Z-axis clips) having a spacer portion 192 with spring clip 194. Fastener 196 may be used to secure member 30 to spacer portion 192 and for securing spacer portion 192 to spring clip 194 to ensure the structural integrity of system 10. Spacer portion 192 may project through an aperture 70 in panel 24 to provide secure abutment with the back of member 30, and supports 198 may project outwardly from spacer portion 192 to provide support to panel 24 around aperture 70. Connectors 190 are attached to one or more lateral frame members 16 (e.g. beams, roof bows, door panels, floor panels, cross headers, etc.) at a lateral position along frame member 16 corresponding to the installation position of members 30. An alternative connector type may also be used such as that shown by connector 60 in FIG. 6. Connectors 60 have a spacer portion 61 and a base portion 62 coupled to a platform 64 that is attached to frame member 16 by finned-plugs 66 (e.g., "Christmas tree connectors") or by a structural adhesive (not shown) such as "BETAMATE 73705" which is a polyurethane adhesive manufactured by the Dow Chemical Corporation and available through Sound Alliance, LLC located in Auburn Hills, Mich. In an alternative embodiment, connectors 60 may be attached to frame member 16 by a two-piece reclosable fastener system (not shown) such as "DUAL LOCK"® having mushroom-head shaped projections and manufactured by the Minnesota Mining and Manufacturing Company, or by a nylon "VELCRO"® hook and fastener structure available from Velcro USA Inc. located in Manchester, N.H. The end of connector 60 opposite from base 62 has a pedestal section 68 that extends through aperture 70 in panel 24 to engage base 32 of members 30. The end of pedestal 68 is configured to abut ribs 34, and a projection (not shown) may be provided extending from the end of pedestal 68 and configured to be captured between longitudinal ribs 34 to improve lateral stability of members 30. Connectors 60 further include supports 74 (wings, braces, arms, etc.) to support the back surface of panel 24 in the proximity of aperture 70. In a preferred embodiment, connectors 190 and 60 are made from ABS. polycarbonate or other suitable plastic and spring clip 194 is made from heat-treated spring steel or wire, however, connectors 190 and 60 may have any shape and material composition appropriate for transferring the load from system 10 through members 30 to frame member 16, and connector 60 may be attached to frame member 16 by any suitable means providing the appropriate tensile strength. Connectors 190 and 60 have a spacer length corresponding to the gap 75 between frame member 16 and panel 24. Following panel 24 installation over pedestal 68 of connectors 60 in the vehicle, members 30 may be positioned over panel 24 and aligned with connectors 190 or 60, whereby members 30 are secured by a threaded fastener or 196 or 76 through base 32 and into connector 190 or 60. In alternative embodiments, other connector structures may be used such as solid blocks (not shown), and panel 24 may be provided without apertures 70 whereby a fastener penetrates the base, panel and the connector. In another alternative embodiment, members 30 may be bowed into a shallow arch-like profile (not shown) and installed with a compression fit between the forward and rearward ends of the roof frame, or other vehicle structure such as floor and roof panels, thus obviating or minimizing the need for mid-span connectors. Further, members 30 may be mounted against panel 24, or alternatively panel segments may be positioned around members 30.

Referring further to FIG. 1, a variety of articles 20 may be mounted to members 30 according to a preferred embodiment. Articles 20 may include storage compartments (with or without key-lock access control) tailored to hold tissues, sunglasses, remote control devices, wireless phones, pagers, personal data assistants (PDA), walkie-talkies, binoculars, cameras, first aid or road-side emergency kits, tools, baby-care products and supplies, arts and crafts supplies, toys, sporting goods, books, maps, hunting and fishing equipment, and many other articles for which readily accessible storage in a vehicle may be useful. Such storage compartments may either be fixed or designed for pull-down, drop-down or rotational access where the compartment is recessed during storage and extended for access during usage. Articles 20 may also include handles, brackets, fixtures (e.g. starter block) for mounting racks, cages, or support pillars for optionally receiving members 30 to mount additional articles 20 in a cargo area, lighting equipment, power adapters and outlets, lighters; visual display screens; audio equipment; media displays; digital video disc players; GPS receivers; cargo storage racks, straps or tie-downs; garment hangers, rods or racks; insulated hot or cold-storage containers, mobile office workstation components, portable air compressors or vacuum cleaners, cargo netting and holders; occupant safety features; specially-adapted consumer-use products such as travel tables, camping gear, pet barriers, luggage, etc.; brackets having rigid, swiveling or rotating couplers for removably receiving such consumer use products; storage racks having fixed or retractable support members for storing skis or other gear; and any other articles which may be useful in conjunction with traveling, working or other vehicle use.

Articles 20 are adapted to be selectively positionable along members 30, however, articles that may deemed to create a distraction to the vehicle operator, such as video displays and the like, are provided with a mounting interlock feature which prevents their installation in certain prohibited positions along the members, for example, allowing video monitors to be installed only in a rearward portion of the vehicle. The interlock function may be accomplished by altering the cross sectional shape or profile of a portion of the members (not shown) or providing a second recess and ledge (not shown). Particular articles 20 may be provided with a mounting profile for engaging members 30 that includes a projection (not shown) that extends into passage 50 whereby installation of a blank (not shown) within a particular portion of passage 50 along member 30 will prevent mounting such articles in the selected locations. Alternatively installation of articles may be selectively restricted by otherwise altering the profile of the members to fit only selected article mounting profiles and may be accomplished by adding a shim (not shown) along one or more sides of member 30 or in connection with the passageway of the member.

Articles 20 suitable for suspension from a single member are configured for attachment to a single member 30 by having means for releasably connecting to the recess 38 and ledge 40 on each side of a member 30. Articles 20 that are more suitable for suspension from two members 30 are configured having a first means on one side of the article for attaching to the recess 38 and ledge 40 on one or both sides of the first member 30, and are configured having a second means on the opposite side of the article for attaching to the recess 38 and ledge 40 on one or both sides of the second member.

Figure 7:
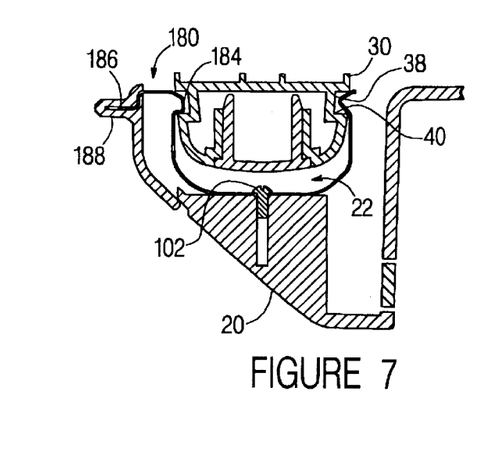
FIG. 7 is a cross sectional view of an attachment in an engaged position for a modular system along line 7—7 of FIG. 5 according to a preferred embodiment.
Figure 8:
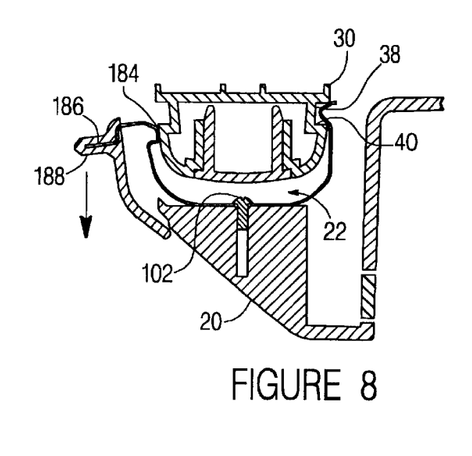
FIG. 8 is the cross sectional view of FIG. 7 for the attachment in a released position for a modular system according to a preferred embodiment.

Referring to FIGS. 7 and 8, a component for attaching articles 20 to members 30 are shown according to a preferred embodiment. A holder 180 (e.g. clamp, spring, clip, etc.) is positioned within an attachment profile 22 (e.g. channel, slot, groove, recess, valley, indent, etc.) on article 20 to align with member 30 and is attached to article 20 by a conventional fastener 102 (shown as a threaded screw but may include finned plugs, adhesive, integral formation, etc.). Holder 180 is configured to resiliently conform to the exterior of member 30 and includes catches 184 (e.g. tabs, ears, dogs, etc.) that are biased inwardly to retain catches 184 within recesses 38 on one or both sides of member 30, whereby catches 184 are vertically supported by ledges 40. An article 20 is removably attached to a member 30 by aligning holder 180 beneath member 30 and exerting force on article 20 whereby catches 184 are forced around sides 36 and catches 184 resiliently fit within recesses 38, where ledge 40 is preferably horizontal (as shown) or angled upwardly and outward to form an angle of 90 degrees or less with recess 38 to ensure secure retention of catch 184. Holder 180 includes an extension 186 fastened to a pivoting latch 188 on an article 20. Extension 186 may be located on either side of holder 180 for an article 20 adapted for suspension from a single member 30, and extension 186 is located on exterior side of holder 180 for articles 20 adapted to be suspended from two members 30. Pulling downward (or outward) on latch 188 causes catch 184 to release from recess 38 and allow article 20 to be removed from member 30. The additional leverage created by releasing a holder 180 from a member 30 on a first side of article 20 allows the holder 180 on a second member to be removed by rotating article 20 in a downward (or outward) direction. In an alternative embodiment, an actuator and a clip having an extension may be positioned on each side of an article for improved ease in removing the article from members 30. In a particularly preferred embodiment, holder 180 is made from spring steel stock having dimensions of approximately 1 millimeter thick but may be in the range of 0.5–2.0 millimeters or other dimensions suitable for providing a resilient holding function for an article 20. However, other materials having suitable dimensions and the appropriate rigidity and resiliency such as plastic or hard rubber may be used for holders in alternative embodiments. Catches 184 on holder 180 may be adapted to engage recesses 38 having a height of approximately 9.2 millimeters and a depth of approximately 3.1 millimeters, but may be the height in the range of 7 to 11 millimeters and the depth may be in the range of 2 to 5 millimeters or any other suitable dimensions according to customer specifications. Catches 184 on holder 180 may also be adapted to engage recesses 38 on each lateral side of member 30 wherein the lateral space between the interior of recesses is approximately 33.8 millimeters, but may be in the range of 26 to 40 millimeters or any other dimensions suitable according to customer specifications. In other alternative embodiments having articles 20 adapted for suspension from two members, a holder on one side of an article may be replaced by a rigid fixture (not shown) designed to engage an exterior recess on a member, whereby the rigid fixture is positioned in place first, then the holder on the opposite side is rotated upward (or inward) and into an engaged position on its respective member.

Figure 9:
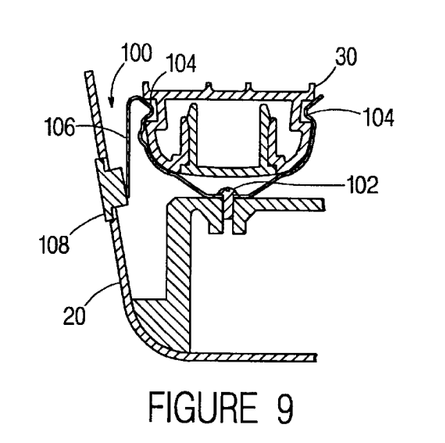
FIG. 9 is the cross sectional view of FIG. 7 for the attachment in an engaged position for a modular system according to an alternative embodiment.
Figure 10:
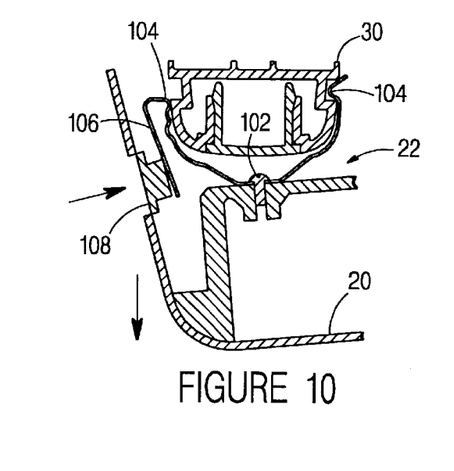
FIG. 10 is the cross sectional view of FIG. 7 for the attachment in a released position for a modular system according to an alternative embodiment.

Referring to FIGS. 9 and 10, a component for attaching articles 20 to members 30 are shown according to an alternative embodiment. A holder 100 (e.g. clamp, spring, clip, etc.) is positioned within an attachment profile 22 (e.g. channel, slot, groove, recess, valley, indent, etc.) on article 20 to align with member 30 and is attached to article 20 by a conventional fastener 102 (shown as a threaded screw but may include finned plugs, adhesive, integral formation, etc.). Holder 100 is configured to resiliently conform to the exterior of member 30 and includes catches 104 (e.g. tabs, ears, dogs, etc.) that are biased inwardly to retain catches 104 within recesses 38 on one or both sides of member 30, whereby catches 104 are vertically supported by ledges 40. An article 20 is removably attached to a member 30 by aligning holder 100 beneath member 30 and exerting a force on article 20 whereby catches 104 are forced around sides 36 and catches 104 resiliently fit within recesses 38, where ledge 40 is preferably configured horizontally (as shown) or angled upward and outward to form an angle of 90 degrees or less relative to recess 38. Holder 100 includes an extension 106 configured to resiliently contact an actuator 108 (e.g. pushbutton, etc.) on an article that has a relative vertical position below ledge 40. Extension 106 may be located on either side of holder 100 for an article 20 adapted for suspension from a single member 30, and extension 106 is located on exterior side of holder 100 for articles 20 adapted to be suspended from two members 30. Extension 106 has a return bend generally in the shape of an inverted "U" and has sufficient stiffness so that manually depressing actuator 108 will outwardly deflect catch 104 sufficiently to clear ledge 40 by simultaneously pulling downward on article 20. The additional leverage created by releasing a holder 100 from a member 30 on a first side of article 20 allows the holder 100 on a second member to be removed by rotating article 20 in a downward (or outward) direction. In an alternative embodiment, an actuator and a clip having an extension may be positioned on each side of an article for improved ease in removing the article from members 30. In other alternative embodiments having articles 20 adapted for suspension from two members, a holder on one side of an article may be replaced by a rigid fixture (not shown) designed to engage an exterior recess on a member, whereby the rigid fixture is positioned in place first, then the holder 100 on the opposite side is rotated upward (or inward) and into an engaged position on its respective member 30.

Figure 11:
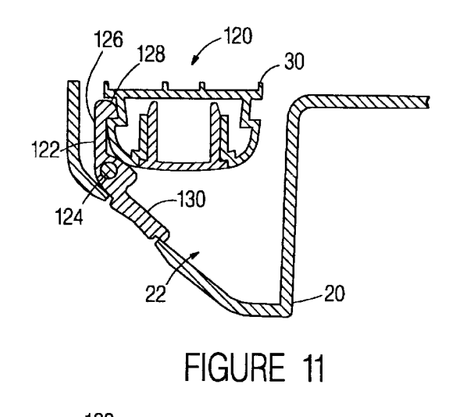
FIG. 11 is the cross sectional view of FIG. 7 for the attachment in an engaged position for a modular system according to another alternative embodiment.
Figure 12:
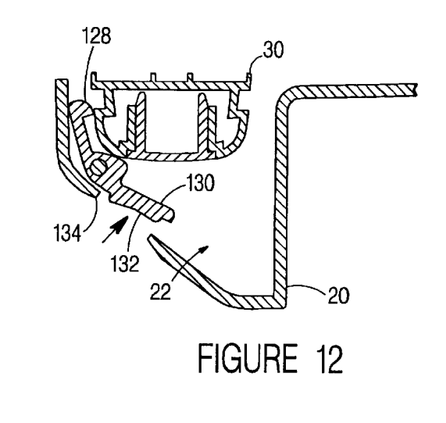
FIG. 12 is the cross sectional view of FIG. 7 for the attachment in a released position for a modular system according to another alternative embodiment.

Referring to FIGS. 11 and 12, a component for attaching articles 20 to members 30 is provided according to another alternative embodiment. A holder 120 includes a latch 122 (e.g. hook, catch, clasp, etc.) pivotally attached to article 20 at pivot 124 in a position aligned with an outward side of a member 30. Latch 122 has an upper end 126 above pivot 124 with a projection 128 extending inwardly therefrom that is shaped to engage recess 38 and ledge 40 of member 30. Latch 122 also has a lower end 130 below pivot 124 that includes an actuator portion 132 cooperating with an aperture 134 in article 20. Latch 122 is biased so that projection 128 is urged inwardly and actuator 132 is urged outwardly. Biasing of latch 122 may be accomplished by a coil spring (not shown) operating about the axis of pivot 124, or by a leaf spring (not shown) positioned between article 20 and upper end 126. Latch 122 is shown having an obtuse angle shape but may have any suitable shape adapted to provide an actuator surface on article 20 and for engaging member 30. Latch 122 may be used in conjunction with an article adapted for suspension from a single member 30, where a single latch 122 is used to engage recess 38 one side of a member 30, and article 20 includes a rigid structure (not shown) designed to engage recess 38 on the opposite side of member 30. Such an article 20 may be removably attached to member 30 by inserting the rigid structure over ledge 40 and exerting a force on the opposite side of article 20 whereby latch 122 resiliently rides over outward side 36 of member 30 and engages recess 38. Latch 122 may also be used in conjunction with an article 20 adapted for suspension from two parallel members 30, where a latch 122 is positioned on one or both sides of article 20 to engage a recess 38 and ledge 40 on the outward side 36 of members 30. Where a latch 122 is used on only one side of such an article 20, a rigid structure (not shown) would be provided on the opposite side of article 20, whereby article 20 is installed by first engaging the rigid structure to recess 38 and then exerting an upward (or inward) force on the opposite side of article 20 whereby latch 122 resiliently rides over outward side 36 of member and engages recess 38. In any configuration, article 20 may be selectively released by depressing actuator 132 to disengage projection 128 from recess 38 and then pulling and/or rotating article 20 downward (or outward).

Figure 13:
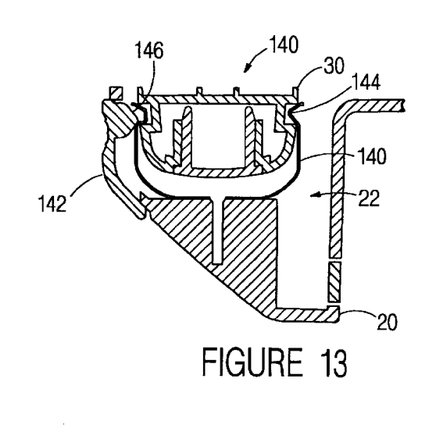
FIG. 13 is the cross sectional view of FIG. 7 for the attachment in an engaged position for a modular system according to a further alternative embodiment.
Figure 14:
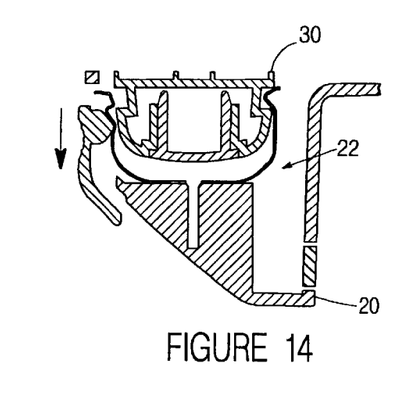
FIG. 14 is the cross sectional view of FIG. 7 for the attachment in a released position for a modular system according to a further alternative embodiment.

Referring to FIGS. 13 and 14, a component for attaching articles 20 to members 30 is provided according to a further alternative embodiment. A latch 142 is coupled to article 20 and configured for vertical sliding engagement with a holder 140. Holder 140 is coupled to article 20 and positioned for alignment with member 30. Holder 140 is generally "U"

shaped to fit around member 30, and configured with inwardly projecting catches 144 for engaging recesses 38. The side of holder 140 oriented to engage latch 142 is outwardly biased whereby sliding latch 142 downward will allow catches 144 to deflect outward for removal or installation of article 20. Latch 142 is coupled to article 20 in a manner that permits vertically slidable operation, whereby detent 146 on latch 142 provides a resistance closure with latch 142 in the upward position and catch 144 engaged within recess 38.

In yet another alternative embodiment, the holders may be replaced with fasteners (e.g. set screws configured to engage recess 38, etc.) that may be loosened for installation of article 20 on members 30 and then the fastener may be tightened to secure the article to the member, or loosened for subsequent repair, replacement, or reorientation within the vehicle.

Figure 3:
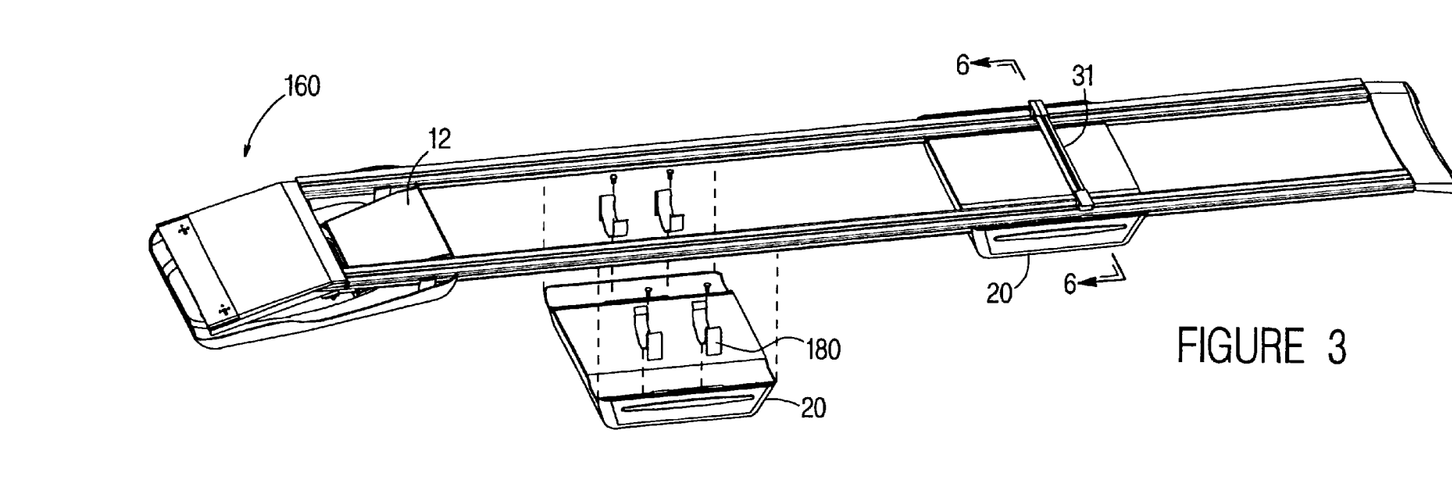
FIG. 3 is a downward looking perspective view of a modular system according to a preferred embodiment.
Figure 5:
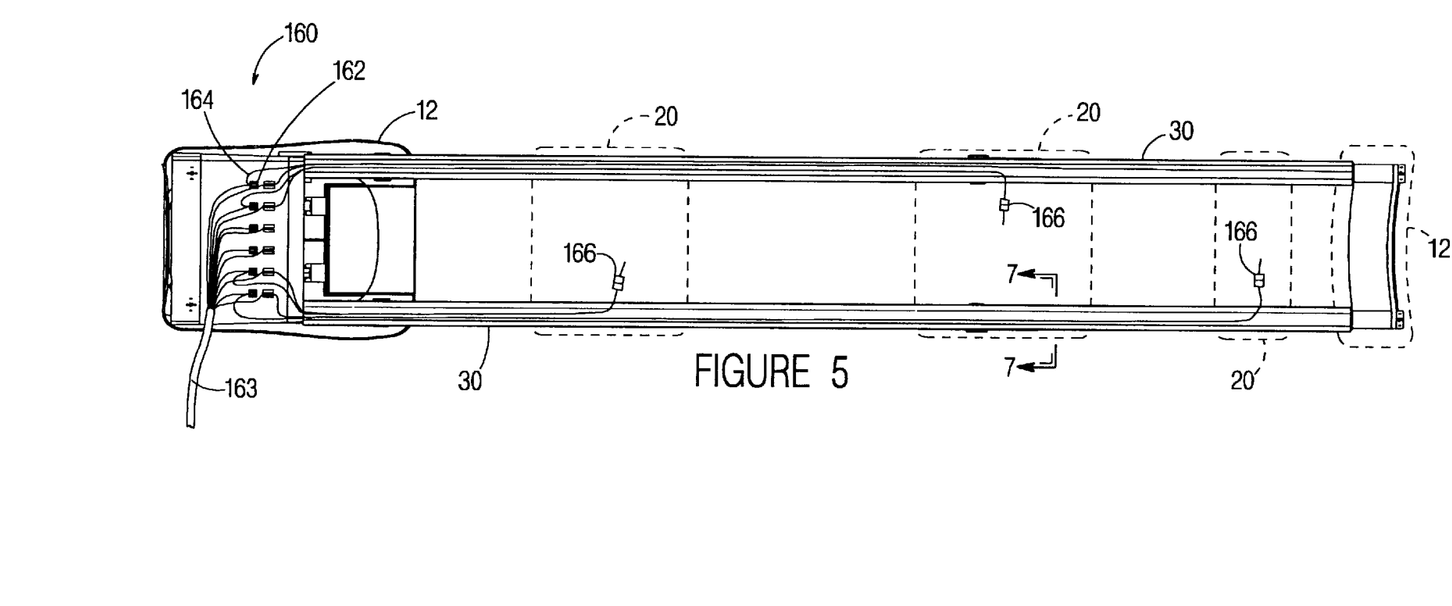
FIG. 5 is an upward looking bottom view of a modular system according to a preferred embodiment.

Referring to FIGS. 3 and 5, a utility interface 160 for system 10 is shown schematically according to a preferred embodiment. Interface 160 is included within the cover 12 for communicating with passageways through the roof structure (not shown) and interfacing with members 30. Interface 160 includes a series of ports 162 (e.g. connectors, receptacles, jacks, plugs, etc.) for facilitating the interconnection of conventional utility carriers 163 (e.g. wires, cables, conductors, harnesses, etc.) for delivering utilities (e.g. electrical power, voice and data communication signals, RF transmission signals, instrumentation signals, etc.) between a supply source (not shown) and articles 20 mounted to members 30. Utilities may be routed from the utility supply source (e.g. a battery, antenna, receiver, transmitter, etc.—not shown) through utility carriers 163 that interconnect the supply source and the ports 162 provided in interface 160. Utility interface 160 may be provided in either the forward or rearward portion of the vehicle.

In a preferred embodiment, utilities may be distributed from interfaces 160 via additional utility carriers 164 that interconnect between interfaces 160 and articles 20. The utility carriers 164 may be distributed throughout system 10 by routing the carriers 164 through passage 50 in members 30 where the carriers 164 are concealed behind cover 54 (shown in FIG. 6) and articles 20. Articles 20 are mounted over members 30 and their covers segments 54, whereby one or more gaps or other openings corresponding to access and egress locations for utilities carriers 164, interfacing with articles 20 may be provided in cover 54, behind article 20, to create a utilities access pattern. The access pattern is adaptable to future changes or modifications in the article selection package by making suitable changes in the removable cover 54 of members 30. Articles 20 and utility carriers 164 may be provided with mating connectors 166 to facilitate ease of installation, replacement or reconfiguration of articles 20 within the system 10. Alternatively, articles 20 may be provided with a fixed length of utility carrier for routing through passage 50 to interface 160, where the carrier includes a terminal at the outward end configured for directly connecting with interface 160. To provide additional flexibility in distributing utilities to various articles, an article 20 may be configured to serve as a utility storage or junction box for housing additional utility distribution devices or components and for storing excess quantities of utility carrier that may be desirable for accommodating future changes to the article selection package.

In an alternative embodiment, low-voltage electrical power in the range of approximately 12–42 volts DC or other suitable voltage range for powering articles 20 may be routed to articles 20 via members 30, where members 30 are fabricated entirely or partially from aluminum or other electrically conductive material. Members 30 may also be fabricated from a non-conducting material such as plastic, where a conducting material such as copper or aluminum is integrally formed with member 30 in the shape of a longitudinal conducting strip, rail or bar (not shown) to provide a uniform electric current access path from interface 160 to articles 20. Such conducting material may be affixed to member 30 by ultrasonic welding, molding, interference-type snap insert, or vacuum metallization. Articles 20 are provided with an electrically conductive contactor (not shown) that projects outwardly from a surface of article 20 and is configured to contact member 30 or a conducting strip thereon (not shown) and remains concealed between member 30 and article 20 when article 20 is installed on member 30 to provide a conductive electrical path to article 20. The contactor may be spring-biased for urging the contactor into continuous contact with member 30 or a conducting strip when article 20 is mounted on members 30. In a preferred embodiment where a system with two parallel members are used, one member 30 would have a positive electrical polarity (i.e. battery potential) and the second member 30 would have a negative electrical polarity (i.e. ground). For embodiments using a single member, two longitudinal conducting strips (not shown) may be used on member 30 to provide positive and negative conductors, corresponding to appropriately positioned contactors on an article 20 configured to mount to a single member 30.

Conducting strips may be used as an article positioning interlock along members 30 by altering the conducting strip longitudinal position along member 30 to provide a power interlock profile. The power interlock profile ensures that contactors for certain articles will properly interface with the conducting strips only when articles are installed at locations on members 30 corresponding to a mating conducting strip position. For example, video display articles may have contactors positioned to match a conducting strip position corresponding only to a location rearward of the front seats of the vehicle. Similarly, other consumer articles that may create a distraction to a vehicle operator may be electrically interlocked so that they are operable only when installed in positions that are preestablished by the power interlock profile. Insulating cover segments (not shown) may be provided that are adapted to cover portions of members 30 that remain exposed after installation of the article selection package to prevent consumer exposure or electrical shorts to ground with the energized portions of system 10.

It is important to note that the construction and arrangement of the elements of the modular system for a vehicle provided herein is illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, use of materials, colors, combinations of shapes, etc.) without materially departing from the novel teachings and advantages of the invention. For example, the modular system may be used in the interior of any vehicle (such as an automobile, truck, sport utility vehicle, van, boat, airplane, train, construction or farming equipment, tractor trailer trucks, motor homes and recreational vehicles, etc.). According to other alternative embodiments, the modular system may be used in connection with articles such as camping gear that are designed to adapt to a stationary vehicle environment.

Further, it is readily apparent that elongated members may be provided in a wide variety of shapes, sizes, thickness, and engagement profiles and adapted for installation along the roof, floor and sides of a vehicle, or within a cargo area or other suitable location within a vehicle. It is also readily apparent that the articles may be designed with any profile suitable for attaching to one or more members and may be adapted for slidable movement along the members. Accordingly, all such modifications are intended to be within the scope of the invention as defined in the appended claims.

What is claimed is:

1. A modular system for a vehicle, comprising:
   one or more elongated members comprising an opening forming an elongated passage and a cover configured to enclose the elongated passage, the one or more elongated members adapted to be coupled to at least one of an interior overhead portion, an interior cargo portion and an interior side portion of a vehicle;
   one or more articles configured to removably attach to the one or more elongated members; and
   a utility system for providing utilities to the one or more articles.

2. The modular system of claim 1, wherein the cover may be segmented into multiple sections to create an access pattern.

3. The modular system of claim 1, wherein the one or more elongated members are coupled to an interior roof portion of the vehicle and are oriented longitudinally with a long axis of the vehicle.

4. The modular system of claim 3, wherein the one or more elongated members are sectioned into a forward portion and a rearward portion.

5. The modular system of claim 4, wherein the forward portion and the rearward portion are separated by a sunroof.

6. The modular system of claim 1, wherein the one or more elongated members are oriented laterally to a long axis of the vehicle.

7. The modular system of claim 1 wherein the one or more elongated members are coupled to an interior door panel.

8. The modular system of claim 1 wherein the one or more elongated members are coupled to an interior side panel of the vehicle.

9. The modular system of claim 1, wherein the one or more articles are interchangably attached to the one or more elongated members.

10. The modular system of claim 9, further comprising an interlock to prevent placement of the one or more articles on the one or more elongated members at locations restricted by the interlock.

11. A modular system for a vehicle, comprising:
    means for mounting one or more elongated members to the interior of a vehicle;
    means for removably attaching one or more articles to the one or more elongated members; and
    means for providing utilities to the one or more articles when the articles are attached to the one or more elongated members.

12. The modular system of claim 11, wherein the means for providing utilities includes at least a portion of the one or more elongated members that are electrically conductive.

13. The modular system of claim 11, wherein the means for removably attaching one or more articles is accomplished without using tools.

14. The modular system of claim 11, further comprising, means for preventing installation of a certain predetermined one of the one or more articles at certain predetermined locations on the one or more elongated members.

15. A method of mounting an article on a vehicle, comprising:
    providing a material for one or more elongated members so that at least a portion of the one or more elongated members is electrically conductive;
    coupling the one or more elongated members to at least one of an interior overhead portion, an interior cargo portion and an interior side portion of the vehicle;
    attaching one or more holders to the article, the one or more holders having a shape adapted to at least partially surround the one or more elongated members;
    mounting the article on the one or more elongated members by releasably engaging the one or more holders and the one or more elongated members; and
    energizing the article.

16. The method of claim 15, further comprising the step of replacing the article with a second interchangeable article.

17. The method of claim 16, wherein the step of replacing the article is accomplished without tools.

18. The method of claim 15, wherein the one or more elongated members are coupled to the interior overhead portion of the vehicle.

19. The method of claim 15, wherein the one or more elongated members are adapted for mounting the article in an interior cargo portion of the vehicle.

20. A system for attaching articles to an interior portion of a vehicle, comprising:
    one or more members having a recess located longitudinally along one or both sides of the one or more members and coupled to at least one of an overhead portion, a cargo portion and a side portion of the interior portion;
    one or more articles adapted for mounting to the one or more members along the interior portion;
    one or more holders coupled to the one or more articles and adapted to interface with the one or more members, the one or more holders positioned on the one or more articles to align with the one or more members and comprising a clamp portion adapted to engage the recess and a latch whereby the clamp portion is released from the recess when the latch is actuated.

21. The system of claim 20, wherein the one or more holders comprise a resilient material urging the clamp portions inward for releasable retention within the recess.

22. The system of claim 20, wherein the latch is slidably actuated.

23. The system of claim 20, wherein the latch is pivotally actuated.

24. The system of claim 20, wherein the latch is push button actuated.

25. The system of claim 20, wherein the one or more holder is a fastener for engaging the one or more member.

26. A method of mounting an article on a vehicle, comprising:
    coupling an elongated member to a headliner of the vehicle;
    attaching a holder to the article, the holder having a shape adapted to at least partially surround the elongated member;
    mounting the article on the elongated member by releasably engaging the holder and the elongated member; and
    energizing the article.

27. The method of claim 26, wherein the step of energizing the article includes routing a utility carrier through a passage in the elongated member.

28. The method of claim 26, wherein the step of energizing the article includes selecting a material for the elongated member so that at least a portion of the elongated member is electrically conductive.

29. The method of claim 26, wherein the holder has a clamp portion configured to grip a recess and a ledge disposed on the elongated member.

30. The method of claim 29, wherein the clamp portion is biased for releasable retention within the recess.

31. A system for attaching articles to an interior portion of a vehicle, comprising:
   a member having a recess, the member coupled to the interior portion;
   an article adapted for mounting to the member along the interior portion; and
   a holder coupled to the article and positioned to align with the member, the holder having an attachment portion comprising a resilient material biased to releasably interface with the member by engaging the recess when the article is mounted on the member, and a latch whereby the attachment portion is released from the recess when the latch is actuated.

32. The system of claim 31, wherein the latch is slidably actuated.

33. A method of attaching an article to an overhead system in a vehicle, the overhead system comprising a pair of elongated members coupled to an interior overhead portion of the vehicle, the method comprising:
   providing the article with a pair of coupling areas adapted to be placed adjacent the pair of elongated members; and
   providing the article with at least one holder member adapted to couple the article to the pair of elongated members.

34. The method of claim 33 wherein the article is configured to receive a supply of power from the elongated member.

35. The method of claim 34 wherein the article is adapted to operably engage an electrically conductive portion of the elongated member for providing the supply of power.

36. The method of claim 34 wherein the article includes a wiring connector for providing the supply of power.

37. The method of claim 33 wherein the holder member is configured to releasably secure the article to the elongated member.

38. The method of claim 33 wherein the holder member is adapted to engage a catch surface on the elongated member.

39. The method of claim 38 wherein the catch surface is a recess that forms a ledge on the elongated member.

40. The method of claim 33 wherein the holder member comprises a resilient portion adapted to bias the holder member in an engaged position to secure the article to the elongated member.

41. The method of claim 40 wherein the resilient portion engages a first side of the elongated member.

42. The method of claim 40 wherein the resilient portion engages a first side and a second side of the elongated member.

43. An article for use with an overhead system in a vehicle having a pair of rails having a non-circular cross section coupled to an interior overhead portion of the vehicle, comprising:
   a body portion having a profile adapted to fit the rail;
   at least one holder member coupled to the body portion and positioned for alignment with the rail when the article is used with the overhead system; the holder member adapted to couple the body portion to the rail.

44. The article of claim 43 wherein the holder member is adapted to releasably secure the body portion to the rail.

45. The article of claim 43 wherein the holder member further comprises a resilient portion adapted to retain the article in an engaged position with the rail.

46. The article of claim 43 wherein the holder member is biased in a coupling orientation.

47. The article of claim 46 wherein the holder member is spring biased.

48. The article of claim 43 wherein the holder member is adapted to engage a catch surface on the rail.

49. The article of claim 48 wherein the catch surface is a recess.

50. The article of claim 49 wherein the recess is configured to provide a ledge.

51. The article of claim 43 wherein article is configured to receive a power supply from the rail.

52. A modular system for a vehicle, comprising:
   one or more elongated members adapted to be coupled to at least one of an interior overhead portion, an interior cargo portion and an interior side portion of a vehicle;
   one or more articles configured to removably and interchangeably attach to the one or more elongated members;
   an interlock configured to prevent placement of the one or more articles on the one or more elongated members at locations restricted by the interlock; and
   a utility system for providing utilities to the one or more articles.

53. The modular system of claim 52, wherein the one or more elongated members include an opening forming an elongated passage within the one or more elongated members.

54. The modular system of claim 53, wherein the one or more elongated members include a cover configured to enclose the elongated passage.

55. The modular system of claim 53, wherein the utility system includes a utility interface communicating with one or more utility supply sources and the one or more elongated members.

56. The modular system of claim 55, wherein the utility interface has a plurality of ports, wherein the ports are each operatively coupled to one of the one or more utility supply sources.

57. The modular system of claim 52 wherein the one or more elongated members have a recess located longitudinally along one or both sides of the one or more members.

58. A modular system for a vehicle, comprising:
   one or more elongated members including an opening forming an elongated passage and adapted to be coupled to at least one of an interior overhead portion, an interior cargo portion and an interior side portion of a vehicle;
   one or more articles configured to removably attach to the one or more elongated members; and
   a utility system comprising a utility interface having a plurality of ports configured to be operatively coupled with one or more utility supply sources and the one or more elongated members for providing utilities to the one or more articles.

59. The modular system of claim 58, wherein the ports are configured to removably receive a first end of one or more utility carriers.

60. The modular system of claim 59, wherein the one or more utility carriers have a second end adapted to communicate with the one or more articles.

61. The modular system of claim 60, wherein the one or more utility carriers are routed within the elongated passage from the interface to the one or more articles.

62. A method of mounting an article on a vehicle, comprising:

coupling one or more elongated members to an interior overhead portion of the vehicle;

attaching one or more holders to the article, the one or more holders having a shape adapted to at least partially surround the one or more elongated members; and mounting the article on the one or more elongated members by releasably engaging the one or more holders and the one or more elongated members.

63. The method of claim 62, further comprising the step of energizing the article.

64. The method of claim 63, wherein the step of energizing the article includes routing one or more utility carriers through a passage in the one or more elongated members.

65. The method of claim 63, wherein the step of energizing the article includes selecting a material for the one or more elongated members so that at least a portion of the one or more elongated member is electrically conductive.

66. The method of claim 62, wherein the one or more holders have one or more clamp portions configured to grip a recess and a ledge disposed longitudinally along one or both sides of the one or more elongated members, the recess and the ledge having a relative angle of 90 degrees or less.

67. The method of claim 66, wherein the one or more clamp portions are urged inwardly for releasable retention within the recesses.

* * * * *